United States Patent
Jiang et al.

(10) Patent No.: US 11,605,169 B2
(45) Date of Patent: Mar. 14, 2023

(54) METHOD AND SYSTEM FOR DETECTING FLOW VELOCITY OF HIGH-TEMPERATURE MOLTEN FLUID

(71) Applicant: CENTRAL SOUTH UNIVERSITY, Hunan (CN)

(72) Inventors: Zhaohui Jiang, Changsha (CN); Lei He, Changsha (CN); Zhipeng Chen, Changsha (CN); Weihua Gui, Changsha (CN); Dong Pan, Changsha (CN); Chunhua Yang, Changsha (CN); Yongfang Xie, Changsha (CN); Haifeng Zhang, Changsha (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 454 days.

(21) Appl. No.: 16/970,344

(22) PCT Filed: Jul. 16, 2019

(86) PCT No.: PCT/CN2019/096143
§ 371 (c)(1),
(2) Date: Aug. 14, 2020

(87) PCT Pub. No.: WO2020/098299
PCT Pub. Date: May 22, 2020

(65) Prior Publication Data
US 2021/0090270 A1    Mar. 25, 2021

(30) Foreign Application Priority Data

Nov. 16, 2018  (CN) .......................... 201811365784.2

(51) Int. Cl.
*G06T 7/246* (2017.01)
*G06T 7/80* (2017.01)
(Continued)

(52) U.S. Cl.
CPC ............ *G06T 7/248* (2017.01); *G01F 1/7086* (2013.01); *G01F 15/00* (2013.01); *G01F 25/10* (2022.01);
(Continued)

(58) Field of Classification Search
CPC . G06T 7/248; G06T 7/80; G06T 2207/10016; G06T 7/507; G06T 7/73;
(Continued)

(56) References Cited

U.S. PATENT DOCUMENTS 6,293,156 B1 * 9/2001 Shen ...................... G01F 1/7082
73/861.26
6,941,005 B2 * 9/2005 Lary ................... G01N 15/1425
382/133

(Continued)

FOREIGN PATENT DOCUMENTS

| CN | 101566639 A | 10/2009 |
| CN | 102103753 A | 6/2011 |

(Continued)

OTHER PUBLICATIONS

Chen, Zhipeng "A Novel Device for Optical Imaging of Blast Furnace Burden Surface: Parallel Low-Light-Loss Backlight High-Temperature Industrial Endoscope" IEEE (Year: 2016).*

(Continued)

*Primary Examiner* — Molly Wilburn
(74) *Attorney, Agent, or Firm* — Syncoda LLC; Feng Ma

(57) ABSTRACT

A method for detecting a flow velocity of a high-temperature molten fluid can include: collecting a video stream of a high-temperature high-velocity molten fluid, decomposing the video stream into a frame image sequence sorted by time, and extracting a molten fluid Region Of Interest (ROI) from the frame image sequence, extracting a molten fluid outline of the molten fluid ROI, and extracting a character- (Continued)

istic block of the molten fluid outline, and obtaining the flow velocity of the molten fluid based on the characteristic block. A flow velocity detection accuracy can be improved for a molten fluid with a high temperature, a high velocity and a high glossiness.

12 Claims, 8 Drawing Sheets

(51) Int. Cl.
  *G01F 15/00* (2006.01)
  *G06K 9/62* (2022.01)
  *G01F 25/10* (2022.01)
  *G06V 10/25* (2022.01)
  *G06V 20/40* (2022.01)
  *G01F 1/7086* (2022.01)

(52) U.S. Cl.
  CPC .............. *G06K 9/6215* (2013.01); *G06T 7/80* (2017.01); *G06V 10/25* (2022.01); *G06V 20/49* (2022.01); *G06T 2207/10016* (2013.01)

(58) Field of Classification Search
  CPC ........ G01F 1/7086; G01F 15/00; G01F 25/10; G01F 1/712; G06K 9/6215; G06K 9/6201; G06V 10/25; G06V 20/49; G06V 10/42; G06V 10/44; G06V 20/40
  See application file for complete search history.

(56) References Cited

U.S. PATENT DOCUMENTS

| | | |
|---|---|---|
| 8,611,595 B2 | 12/2013 | Son |
| 2011/0150284 A1 | 6/2011 | Son |
| 2014/0078313 A1 | 3/2014 | Son et al. |

FOREIGN PATENT DOCUMENTS

| | | |
|---|---|---|
| CN | 102337369 A | 2/2012 |
| CN | 103035011 A | 4/2013 |
| CN | 103480813 A | 1/2014 |
| CN | 103624234 A | 3/2014 |
| CN | 104036522 A | 9/2014 |
| CN | 104131126 A | 11/2014 |
| CN | 104198752 A | 12/2014 |
| CN | 105478737 A | 4/2016 |
| CN | 105488816 A | 4/2016 |
| CN | 105701842 A | 6/2016 |
| CN | 107093187 A | 8/2017 |
| CN | 109543587 A | 3/2019 |
| KR | 20110131678 A | 12/2011 |

OTHER PUBLICATIONS

Yufei Zha, Video Object Tracking Method, Jul. 31, 2015 (Jul. 31, 2015), p. 1-10.
International Search Report in the international application No. PCT/CN2019/096143, dated Oct. 14, 2019.
First Office Action of the Chinese application No. 201811365784.2, dated Aug. 30, 2019.
Notice of Allowance of the Chinese application No. 201811365784. 2, dated Jan. 14, 2020.

\* cited by examiner

| $e(x-1,y-1)$ | $e(x,y-1)$ | $e(x+1,y-1)$ | 0 | 0 | 0 |
|---|---|---|---|---|---|
| $e(x-1,y)$ | $e(x,y)$ | $e(x+1,y)$ | 1 | 1 | 0 |
| $e(x-1,y+1)$ | $e(x,y+1)$ | $e(x+1,y+1)$ | 0 | 0 | 0 |

METHOD AND SYSTEM FOR DETECTING FLOW VELOCITY OF HIGH-TEMPERATURE MOLTEN FLUID

CROSS-REFERENCE TO RELATED APPLICATIONS

The present application is a national stage of International Application No. PCT/CN2019/096143 filed on Jul. 16, 2019, which claims priority to Chinese Patent Application No. 201811365784.2 filed on Nov. 16, 2018. The disclosures of these applications are hereby incorporated by reference in their entireties.

TECHNICAL FIELD

The disclosure mainly relates to the technical field of flow velocity detection of a high-temperature molten fluid, and in particular to a method and a system for detecting a flow velocity of the high-temperature molten fluid.

BACKGROUND

In metallurgical industry, both ferrous metal and nonferrous metal are mostly extracted from an ore or an ore concentrate with a pyro-metallurgy method under a high-temperature condition. The produced molten crude metal or metal concentrate and slag are flowed out at a high speed from a high-temperature sealed reaction furnace. For example, molten iron is flowed out from a tapping hole of a blast furnace in an industrial process of steel, copper matte is flowed out from a reverberatory furnace in an industrial process of copper pyro-metallurgy, and crude zinc is flowed out from a smelting furnace in a process of zinc pyrometallurgy, etc. A change trend of a pressure in the reaction furnace is an important indicator for characterizing whether the reaction furnace operates stably and smoothly. However, due to a severe environment in the reaction furnace, it is difficult to directly detect a change situation of the pressure in the reaction furnace. Detecting a flow velocity of a molten fluid at an outlet of the reaction furnace can characterize the pressure in the reaction furnace, and meanwhile reflect a proportional relationship between produced metal and slag, and contribute to timely finding and eliminating an abnormal working condition, improving the permeability of the reaction furnace, to make sure the reaction furnace operating stably and smoothly. Therefore, it is particularly important for safety production, quality improvement and quantity promotion of the reaction furnace to detect the flow velocity of the molten fluid at the outlet of the reaction furnace.

A subject to be detected by the disclosure is a high-temperature high-glossiness molten fluid outflowed from the outlet of the reaction furnace. Meanwhile, there are inevitable vibration and a great deal of unevenly distributed dust existing at the detection site. As a result, the difficulty of detection is significantly increased. In the conventional art, detection methods mainly include a contact measurement method and a non-contact measurement method. The contact measurement method for detecting the high-temperature molten fluid needs to use a high temperature resistant material which directly contacts with the high-temperature molten fluid. The high temperature resistant material is gradually worn and eroded by the high-temperature fluid flowing at a high velocity, resulting in a poor repeatability and a short service life of an apparatus. Moreover, the service life and the operation performance of the apparatus are also affected by the severe environment with a great deal of dust and a high temperature. Further, the investment cost is high and the detection accuracy is low. As a result, the contact measurement method is greatly limited. As for the non-contact detection method, a purpose of non-intrusive detecting the flow velocity is mainly achieved by means of establishing a mechanism model. Nevertheless, the detection accuracy is also affected seriously by an ultra-high-temperature and a severe environment of the subject to be detected.

An invention patent application CN103480813A discloses a device and a method for measuring a flow velocity of a high-temperature liquid steel from a continuous casting crystallizer. A working principle thereof is as follows. A bearing is fixed to a fixing device through a fixing shaft. A spring and a measurement rod are installed on upper and lower symmetrical positions of the bearing respectively. The spring is installed on the "T"-type fixing device. The bearing is provided with a bearing bush. The bearing bush is connected to an angle displacement sensor through a coupling. The angle displacement sensor is powered by a power supply to record a real-time deflection angle of the measurement rod in the flowing liquid steel, transmit the real-time deflection angle to a data collection and analysis system through a data line, and convert the angle data into a liquid steel flow velocity value. However, the apparatus of this application needs to be re-calibrated according to different subjects to be detected and it needs to be preheated to 1200-1400° C. before use. As a result, the apparatus is complex in use, and a detection range is narrow. A detection error is large for a fluid having an over-high flow velocity. Moreover, after the detection, the apparatus cannot directly detect a next subject, and the repeatability in use is limited.

An invention patent application CN104131126 A discloses a blast furnace slag flow detection method based on a fuzzy model. The method establishes a fuzzy reasoning model of the blast furnace slag flow amount. A fuzzy membership function of a slag height at an $i^{th}$ moment is set based on influence of the slag height at the $i^{th}$ moment on the blast furnace slag flow amount. A blast furnace slag flow amount calculation model is established by utilizing the fuzzy reasoning model and the fuzzy membership function. A total real-time blast furnace slag flow amount is detected online by using the blast furnace slag flow amount calculation model. However, an initial value in this application is obtained by a technologist based on experiential knowledge of manual operation, so the influence of a human factor is large and the subjectivity is strong. Furthermore, the design process is an open loop, and the accuracy of a long-term operation result cannot be guaranteed.

SUMMARY

A method and a system for detecting a flow velocity of a high-temperature molten fluid provided by the disclosure solve a technical problem that a detection accuracy for the flow velocity of the molten fluid with a high temperature, a high velocity and a high glossiness presently is not high.

In order to solve the above-mentioned technical problem, a method for detecting a flow velocity of a high-temperature molten fluid provided by the disclosure includes the following operations.

A video stream of a high-temperature high-velocity molten fluid is collected.

The video stream is decomposed into a frame image sequence sorted by time, and a molten fluid Region Of Interest (ROI) is extracted from the frame image sequence.

A molten fluid outline of the molten fluid ROI is extracted.

A characteristic block of the molten fluid outline is extracted, and the flow velocity of the molten fluid is obtained based on the characteristic block, and the characteristic block specifically is a ripple or shadow present during outflowing of the high-temperature molten fluid at a high-velocity.

Further, the operation that a molten fluid outline of the molten fluid ROI is extracted includes the following operations.

The molten fluid ROI is preprocessed to obtain a preprocessed image.

A gradient magnitude and a direction of the preprocessed image are calculated by using a first-order partial-derivative finite difference, and non-maximum suppression is performed on the gradient magnitude.

The molten fluid outline of the molten fluid ROI is detected and connected by using a dual-threshold algorithm, and the molten fluid outline is thinned by using a skeleton extraction algorithm.

Further, the operation that a characteristic block of the molten fluid outline is extracted includes the following operations.

A pixel point in quasi-horizontal distribution is culled from the molten fluid outline, a characteristic block pixel point forming a preset inclination angle with a horizontal direction is retained, and a characteristic block outline is separated from the molten fluid outline.

A minimum distance, an upper-endpoint height difference and an included angle difference between two adjacent curves in the characteristic block outline are calculated, and the characteristic block of the molten fluid outline is roughly positioned based on the minimum distance, the upper-endpoint height difference and the included angle difference.

The characteristic block outline is complemented based on the molten fluid outline, and the characteristic block of the molten fluid outline is accurately positioned based on a centroid of the characteristic block with a complemented outline.

Further, the operation that the flow velocity of the molten fluid is obtained based on the characteristic block includes the following operations.

A characteristic of the characteristic block is obtained, and the characteristic includes a size characteristic, an angle characteristic and a position characteristic.

Similarity matching is performed between two adjacent frames by using the characteristic of the characteristic block, to obtain a pixel distance moved by the characteristic block within a time period of two adjacent frames.

According to installation parameters on site, a high-speed camera that collects the video stream of the high-temperature high-velocity molten fluid is calibrated, to establish a relationship between an image coordinate system and a world coordinate system.

A moved distance of the characteristic block in the world coordinate system is solved, with a calculation formula for calculating the moved distance:

$$S_W = \frac{R}{R_c} S_C.$$

Here, $S_W$ is the moved distance of the characteristic block in the world coordinate system, R is a diameter of a round hole of an outlet of a reaction furnace, $R_c$ is a diameter pixel of the outlet of the reaction furnace in an image, and $S_c$ is the pixel distance moved by the characteristic block of the molten fluid within a time period of two adjacent frames.

The flow velocity of the high-temperature high-velocity molten fluid is obtained based on the moved distance and a velocity formula.

Further, the operation that a characteristic of the characteristic block is obtained includes the following operations.

An $(i+j)^{th}$ moment of a boundary point of the characteristic block is calculated, with a calculation formula:

$$\mu_{ij} = \sum_{m=0}^{M} (x_m - x_t)^i (y_m - y_t)^j.$$

Here, $\mu_{ij}$ is the $(i+j)^{th}$ moment of the boundary point of the characteristic block, M is a number of boundary pixel points of the characteristic block, m=0, 2, . . . , M, $(x_m, y_m)$ is an $m^{th}$ pixel point in a boundary of the characteristic block, and $(x_t, y_t)$ are coordinates of the centroid.

A semi-major axis $r_1$ and a semi-minor axis $r_2$ of an equivalent ellipse of the characteristic block are calculated according to the $(i+j)^{th}$ moment, with a calculation formula:

$$\begin{cases} r_1 = \sqrt{2\left(\mu_{2,0} + \mu_{0,2} + \sqrt{(\mu_{2,0} - \mu_{0,2})^2 + 4\mu_{1,1}^2}\right)} \\ r_2 = \sqrt{2\left(\mu_{2,0} + \mu_{0,2} - \sqrt{(\mu_{2,0} - \mu_{0,2})^2 + 4\mu_{1,1}^2}\right)} \end{cases}.$$

Here, $r_1$ and $r_2$ are respectively the semi-major axis and the semi-minor axis of the equivalent ellipse of the characteristic block, $\mu_{2,0}$ is a value of $\mu_{ij}$ when i=2, j=0, $\mu_{0,2}$ is a value of $\mu_{ij}$ when i=0, j=2, and is a value of $\mu_{1,1}$ when i=1, j=1.

An included angle between the equivalent ellipse of the characteristic block and a horizontal direction is calculated based on the $(i+j)^{th}$ moment, with a calculation formula:

$$\beta = -\frac{1}{2}\arctan\left(\frac{2\mu_{1,1}}{\mu_{0,2} - \mu_{2,0}}\right)$$

Here, $\beta$ is the included angle between the equivalent ellipse of the characteristic block and the horizontal direction.

The centroid of the characteristic block is calculated by using a centroidal formula:

$$\begin{cases} x_t = \frac{1}{N}\sum_{n=0}^{N-1} x_n \\ y_t = \frac{1}{N}\sum_{n=0}^{N-1} y_n \end{cases}.$$

Here, $(x_t, y_t)$ is the centroid of the characteristic block, N is a number of pixel points of a connected domain, and $(x_n, y_n)$ are coordinates of an $n^{th}$ pixel point in the connected domain.

The characteristic of the characteristic block is obtained according to the semi-major axis $r_1$, the semi-minor axis $r_2$, the included angle $\beta$ and the centroid $(x_t, y_t)$.

Further, the operation that similarity matching is performed between two adjacent frames by using the characteristic of the characteristic block, to obtain a pixel distance moved by the characteristic block within a time period of two adjacent frames includes the following operations.

Step 1: with a horizontal coordinate $x_t$ of a centroid of a characteristic block in a previous frame of image $T(x, y)$ as a start point, searching a centroid $x'_t$ of a characteristic block backwards along a horizontal axis in a later frame of image $T'(x, y)$.

Step 2: the centroid meeting a condition of $x'_t - x_t < 1$ is labeled in the image $T'(x, y)$, with 1 being a threshold set according to observation.

Step 3: whether a longitudinal coordinate of the labeled centroid meets $|y'_t - y_t| \leq h'$ is determined, where h' is a set threshold, and $y'_t$ and $y_t$ are respectively the longitudinal coordinate of the centroid of the characteristic block in the later frame of image and the longitudinal coordinate of the centroid of the characteristic block in the previous frame of image; and if no, removing a label of the characteristic block, skipping to coordinates of a next centroid of the image $T(x, y)$, and continuing the step 1.

Step 4: a semi-major axis $r_1'$, a semi-minor axis $r_2'$, and an included angle $\beta'$ of the labeled characteristic block of the image $T'(x, y)$ are calculated, and converted into three parameters $(r_1' \cos \beta', r_1' \sin \beta', r_2')$ having a same dimension, characteristic block parameters are represented by $(x'_1, x'_2, x'_3)$, and similarly, characteristic block parameters of the image $T(x, y)$ are represented by $(x_1, x_2, x_3)$.

Step 5: in order to evaluate a similarity between the two characteristic blocks in real time online, a similarity coefficient is calculated with a following formula:

$$\rho = \frac{\sum_{k=1}^{3} x_k x'_k}{\sqrt{\sum_{k=1}^{3} x_k^2} \sqrt{\sum_{k=1}^{3} x_k'^2}}.$$

Here, $\rho$ is the similarity coefficient, p has a value in a range of $[-1, 1]$, $x_k$ is a $k^{th}$ characteristic block parameter of the image $T(x, y)$, and $x'_k$ is a $k^{th}$ characteristic block parameter of the image $T'(x, y)$; if a characteristic block in the image $T'(x, y)$ having a maximized matching similarity $\rho$ and meeting $\rho > \xi$, it is considered as successful matching, to obtain a horizontal pixel distance $S_C$ moved by the characteristic block, skipping to coordinates of a next centroid of the image $T(x, y)$, and continuing the step 1, in which a calculation formula of $S_C$ is:

$$S_C = x'_t - x_t.$$

A system for detecting a flow velocity of a high-temperature molten fluid provided by the disclosure includes a high-speed camera video capture unit, as well as a video collection unit, an outline extraction unit and a molten fluid flow velocity detection unit sequentially connected to the high-speed camera video capture unit.

The high-speed camera video capture unit is configured to collect a video stream of a high-temperature high-velocity molten fluid.

The video collection unit is configured to decompose the video stream into a frame image sequence sorted by time, and extract a molten fluid ROI from the frame image sequence.

The outline extraction unit is configured to extract a molten fluid outline of the molten fluid ROI.

The molten fluid flow velocity detection unit is configured to extract a characteristic block of the molten fluid outline, and obtain the flow velocity of the molten fluid based on the characteristic block, and the characteristic block specifically is a ripple or shadow present during outflowing of the high-temperature molten fluid at a high-velocity.

Further, the high-speed camera video capture unit includes a high-speed camera configured to collect the video stream of the high-temperature high-velocity molten fluid, a lens dust-proof sweeping module disposed on the high-speed camera, and a high-speed camera air-cooling module.

The lens dust-proof sweeping module is configured to sweep a lens of the high-speed camera when the high-speed camera is not in work.

The high-speed camera air-cooling module is configured to cover a body of the high-speed camera completely, and accelerate a flow rate of air between an air-cooling apparatus and the body of the high-speed camera via an external blower to achieve heat dissipation and cooling.

Further, the video collection unit includes a video collection module and a video processing module. The video collection module includes: an Analog/Digital (A/D) module configured to convert a video source analog signal from the high-speed camera video capture unit into a digital signal, a memory module configured to store a video signal, and a video compression module configured to compress the video signal and transmit the compressed video signal to the video processing module.

The video processing module includes: a video stream decomposition module configured to decompose a compressed video stream transmitted from the video collection module into frame images sorted by time, and a frame image ROI extraction module configured to extract a molten fluid ROI from the frame images and transmit an extracted frame image group to the outline extraction unit.

Further, the molten fluid flow velocity detection unit includes a characteristic block refined positioning module, as well as a characteristic block matching module and a flow velocity detection module sequentially connected to the characteristic block refined positioning module.

The characteristic block refined positioning module includes a quasi-horizontal pixel culling submodule, a characteristic block identifying and rough positioning submodule, and a characteristic clock accurate positioning submodule.

The quasi-horizontal pixel culling submodule is configured to cull a pixel point in quasi-horizontal distribution from the molten fluid outline, retain a characteristic block pixel point forming a large inclination angle with a horizontal direction, and separate a characteristic block outline from the molten fluid outline.

The characteristic block identifying and rough positioning submodule is configured to calculate a minimum distance, an upper-endpoint height difference and an included angle difference between two adjacent curves in the characteristic block outline, and roughly position the characteristic block of the molten fluid outline based on the minimum distance, the upper-endpoint height difference and the included angle difference.

The characteristic clock accurate positioning submodule is configured to complement the characteristic block outline based on the molten fluid outline, and accurately position the characteristic block of the molten fluid outline based on a centroid of the characteristic block with a complemented outline.

The characteristic block matching module is configured to perform similarity matching between two adjacent frames by using the characteristic of the characteristic block, to obtain a pixel distance moved by the characteristic block within a time period of two adjacent frames.

The flow velocity detection module includes a camera calibration submodule and a flow velocity output submodule. The camera calibration submodule is configured to calibrate a high-speed camera and solve a moved distance of the characteristic block in a world coordinate system. The flow velocity output submodule is configured to calculate and output the flow velocity of the molten fluid.

Compared with the conventional art, the disclosure has the following advantages.

According to the method and the system for detecting the flow velocity of the high-temperature molten fluid provided by the disclosure, by collecting a video stream of a high-temperature high-velocity molten fluid, decomposing the video stream into a frame image sequence sorted by time, and extracting a molten fluid ROI from the frame image sequence, extracting a molten fluid outline of the molten fluid ROI, extracting a characteristic block of the molten fluid outline, and obtaining the flow velocity of the molten fluid based on the characteristic block which is a ripple or shadow present during outflowing of the high-temperature molten fluid at a high-velocity, a technical problem that a flow velocity detection accuracy to a molten fluid with a high temperature, a high velocity and a high glossiness presently is not high is solved. By obtaining a high-frame-rate video stream of an outflow of the high-temperature molten fluid in a non-intrusive manner, by accurately tracking and positioning a small target significant characteristic block of the molten fluid in real time, a flow velocity detection process for the molten fluid with the high temperature, the high velocity and the high glossiness is achieved. The method and the system have the advantages of high accuracy, strong stability, long periodicity, applicability to a high-temperature or ultra-high-temperature fluid flowing at a high velocity, low investment cost, etc.

BRIEF DESCRIPTION OF THE DRAWINGS

FIG. 4 is a matrix schematic diagram of a quasi-horizontal pixel culling module according to Embodiment 2 of the disclosure.

REFERENCE SIGNS

10: high-speed camera video capture unit, 20: video collection unit, 30: outline extraction unit, 40: molten fluid flow velocity detection unit, 101: high-speed camera, 102: lens dust-proof sweeping module, 103: high-speed camera air-cooling module, 201: video collection module, 202: video processing module, 401: characteristic block refined positioning module, 402: characteristic block matching module, and 403: flow velocity detection module.

DETAILED DESCRIPTION

In order to further understand the disclosure, a more complete and detailed description is made to the disclosure below in combination with preferred embodiments and the accompanying drawings of the specification. However, a protection scope of the disclosure is not limited to the following specific embodiments.

The embodiments of the disclosure are described below in detail in combination with the accompanying drawings. However, the disclosure may be implemented in a variety of manners defined and covered by the claims.

Embodiment 1

Figure 1:
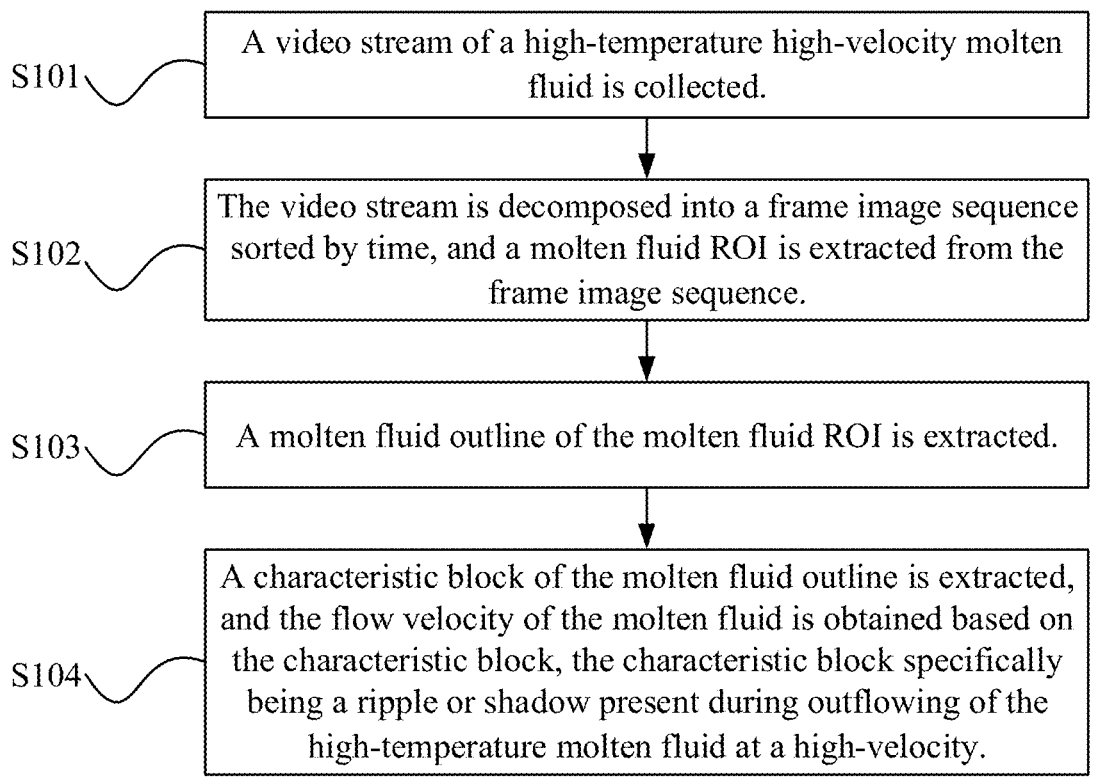
FIG. 1 is a flowchart of a method for detecting a flow velocity of a high-temperature molten fluid according to Embodiment 1 of the disclosure.

Referring to FIG. 1, a method for detecting a flow velocity of a high-temperature molten fluid provided by Embodiment 1 of the disclosure includes the following steps.

At S101: a video stream of a high-temperature high-velocity molten fluid is collected.

At S102: the video stream is decomposed into a frame image sequence sorted by time, and a molten fluid ROI is extracted from the frame image sequence.

At S103: a molten fluid outline of the molten fluid ROI is extracted.

At S104: a characteristic block of the molten fluid outline is extracted, and the flow velocity of the molten fluid is obtained based on the characteristic block. The characteristic block specifically is a ripple or shadow present during outflowing of the high-temperature molten fluid at a high-velocity.

According to the method for detecting the flow velocity of the high-temperature molten fluid provided by this embodiment of the disclosure, by collecting a video stream of a high-temperature high-velocity molten fluid, decomposing the video stream into a frame image sequence sorted by time, and extracting a molten fluid ROI from the frame image sequence, extracting a molten fluid outline of the molten fluid ROI, and extracting a characteristic block of the molten fluid outline, and obtaining the flow velocity of the molten fluid based on the characteristic block which specifically is a ripple or shadow present during outflowing of the high-temperature molten fluid at a high-velocity, a technical problem that a flow velocity detection accuracy to a molten fluid with a high temperature, a high velocity and a high glossiness presently is not high is solved. By obtaining a high-frame-rate video stream of an outflow of the high-temperature molten fluid in a non-intrusive manner, by accurately tracking and positioning a small target significant characteristic block of the molten fluid in real time, a flow velocity detection process for the molten fluid with the high temperature, the high velocity and the high glossiness is achieved.

Specifically, in the conventional art, a detection accuracy is seriously affected by an ultra-high-temperature and a severe environment of a subject to be detected, regardless of whether a flow velocity of a high-temperature molten fluid is detected in a contact or a non-contact manner. The embodiments of the disclosure originally propose a method for detecting the flow velocity of the molten fluid with a high temperature, a high velocity and a high glossiness, by extracting a characteristic block of a molten fluid outline which is a ripple or shadow present during outflowing of the high-temperature molten fluid at a high-velocity, and by accurately tracking and positioning a small target significant characteristic block of the molten fluid in real time. The method has the advantages of high accuracy, strong stability, long periodicity, applicability to a high-temperature or ultra-high-temperature fluid flowing at a high velocity, low investment cost, etc.

Embodiment 2

Figure 2:
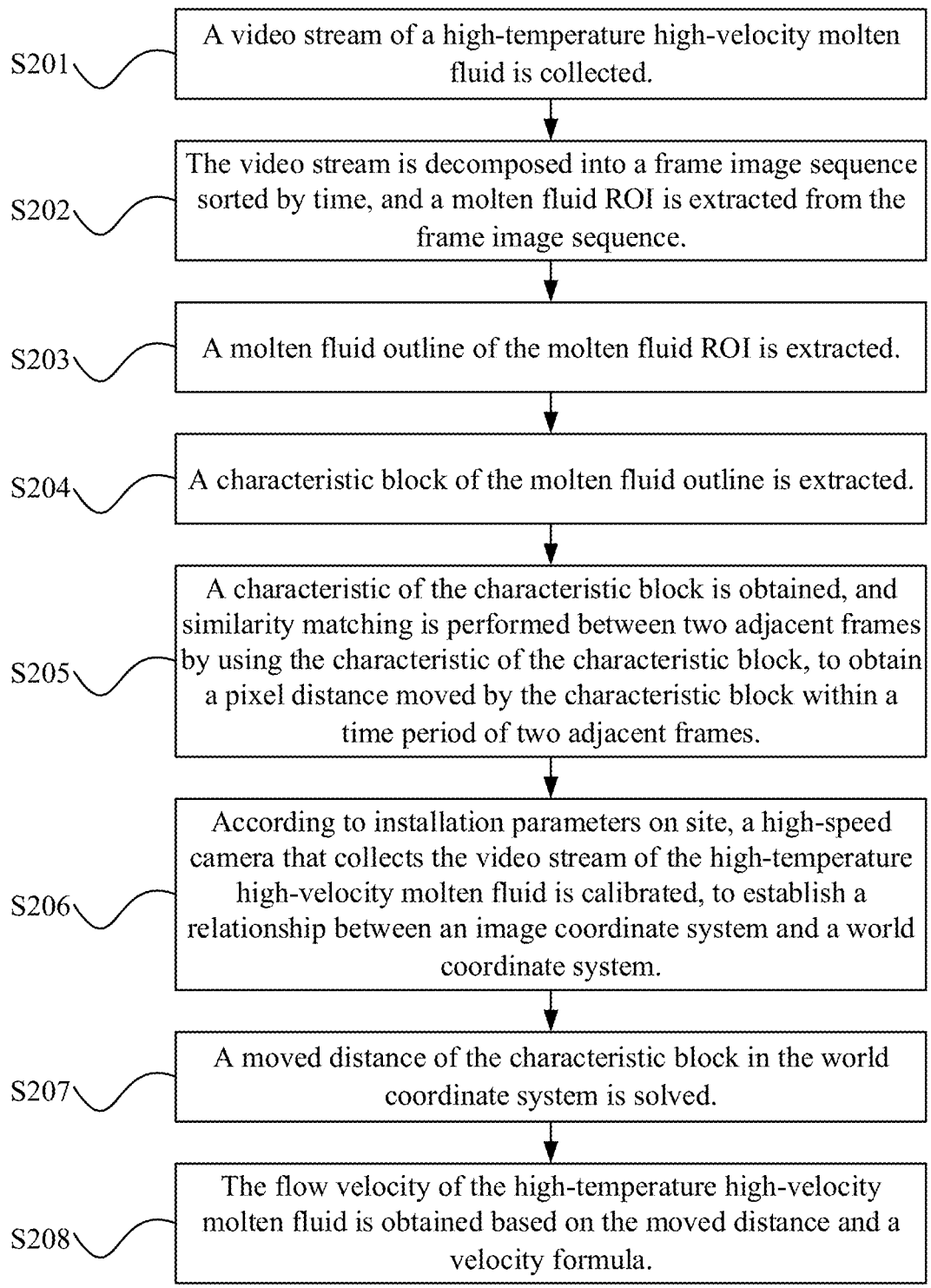
FIG. 2 is a flowchart of a method for detecting a flow velocity of a high-temperature molten fluid according to Embodiment 2 of the disclosure.

Referring to FIG. 2, a method for detecting a flow velocity of a high-temperature molten fluid provided by Embodiment 2 of the disclosure includes the following steps.

At S201: a video stream of a high-temperature high-velocity molten fluid is collected.

Specifically, the video stream of the high-temperature high-velocity molten fluid is collected by a high-speed camera in this embodiment of the disclosure.

At S202: the video stream is decomposed into a frame image sequence sorted by time, and a molten fluid ROI is extracted from the frame image sequence.

Specifically, in this embodiment, after video stream information of a high-temperature high-velocity molten fluid subject is collected by the high-speed camera, the video stream collected within a period of time is decomposed into the frame image sequence sorted by the time, and the molten fluid ROI is extracted from the frame image sequence. Then, the ROI is subjected to an image enhancement operation, and an outline of the molten fluid characteristic block is extracted by a single-pixel outline extraction module, such that a binary frame outline image of the molten fluid is obtained.

At S203: a molten fluid outline of the molten fluid ROI is extracted.

Specifically, a frame image group is preprocessed first, including grayscale processing and image enhancement processing. For a color image, there are multiple color spaces, and it is most convenient to convert into a gray space by a Red-Green-Blue (RGB) data processing. A to-be-processed frame image group signal transmitted to a Field Programmable Gate Array (FPGA) is first subjected to a RGB-to-gray conversion to obtain one way gray signal for subsequent processing, with a conversion formula as follows, $$\text{gray} = 0.3 \times R + 0.59 \times G + 0.11 \times B \tag{1}$$

An edge of the image corresponds to a high-frequency portion of Fourier transformation of the image, and a background region of the image corresponds to a low-frequency portion in a frequency domain of the image. Hence, a high-frequency component in the image may be passed smoothly by a frequency domain high-pass filtering method, to enhance detailed information of the image. An image enhancement procedure is implemented by an exponential high-pass filter, and a transfer function thereof is:

$$H(u,v) = \exp\{-[D_0/D(u,v)]^n\} \tag{2}$$

Here, D(u, v) is a distance from a central original point of gray(x, y) Fourier transformation, and $D_0$ is a cut-off frequency. Gray(u, v) is obtained after the Fourier transformation of the image gray(x, y), and multiplied with H(u, v) for Fourier inversion, to obtain a high-pass filtered image, that is, $$N(x,y) = \mathcal{F}^{-1}[H(v) * \text{Gray}(u,v)] \tag{3}$$

Figure 3:
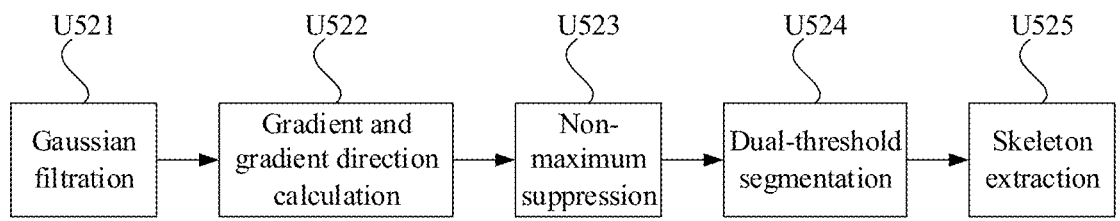
FIG. 3 is a flowchart of a method for extracting a molten fluid outline of a molten fluid ROI according to Embodiment 2 of the disclosure.

In this embodiment of the disclosure, after the preprocessing of the frame image group, a single-pixel outline of the molten fluid ROI is extracted. Among typical outline detection operators, a Canny operator has the advantages of high positioning accuracy, accurate detection, strong anti-interference capability and the like, in aspect of outline detection, but an extracted outline is a non-single pixel outline. In this sense, after the output of the Canny operator, a skeleton extraction program of morphology is added to thin the outline. Extracting the single-pixel outline of the molten fluid ROI in this embodiment of the disclosure mainly includes five steps, namely, Gaussian filtration U521, gradient and gradient direction calculation U522, non-maximum suppression U523, dual-threshold segmentation U524 and skeleton extraction U525. As shown in FIG. 3, first of all, a Gaussian filter is used to smooth the image to reduce noise interference; then, the gradient amplitude and direction of the image are calculated by using a first-order partial-derivative finite difference, the non-maximum suppression is performed on the gradient amplitude, and the outline is detected and connected by using a dual-threshold algorithm; and at last, the outline is thinned by using a skeleton extraction algorithm.

At S204: a characteristic block of the molten fluid outline is extracted.

Specifically, the step that a characteristic block of the molten fluid outline is extracted includes the following operations in this embodiment of the disclosure.

At S2041: a pixel point in quasi-horizontal distribution is culled from the molten fluid outline, a characteristic block pixel point forming a preset inclination angle with a horizontal direction is retained, and a characteristic block outline is separated from the molten fluid outline.

Specifically, a line of the molten fluid outline detected in this embodiment is substantially in a horizontal status, and there is a large included angle between the characteristic block and the line of the molten fluid outline. For this characteristic, the pixel point in the quasi-horizontal distribution in the image is culled, the characteristic block pixel point forming a large inclination angle with a horizontal direction is retained, such that the characteristic block outline is separated from the line of the molten fluid outline.

The molten fluid image E(x, y) is binarized. With a pixel point e(x, y) in the image E(x, y) as a center, a 3×3 gray value matrix X is formed with eight adjacent domains thereof, and a weight matrix A is set, as shown in FIG. 4. In FIG. 4, (a) is the gray value matrix X, and (b) is the weight matrix A. A target pixel point set S2 is searched, with an expression:

$$\Omega = \arg\max_{\Omega}[A. * X] \tag{4}$$

The obtained pixel point gray value b(x, y) of the image is determined by the set Ω, that is, $$b(x, y) = \begin{cases} 0, & (x, y) \in \Omega \\ e(x, y), & \text{otherwise} \end{cases} \tag{5}$$

A discrete small regional pixel point of the image is removed to obtain a processed image B(x, y). A quasi-horizontal pixel point of a non-characteristic block portion of the molten fluid outline is substantially eliminated, and a complete characteristic block outline is retained. A pixel of a line on a top of the characteristic block is quasi-horizontal and is removed inevitably, and the characteristic block is divided into two curves.

At S2042: a minimum distance, an upper-endpoint height difference and an included angle difference between two adjacent curves in the characteristic block outline are calculated, and the characteristic block of the molten fluid outline is roughly positioned based on the minimum distance, the upper-endpoint height difference and the included angle difference.

Figure 5:
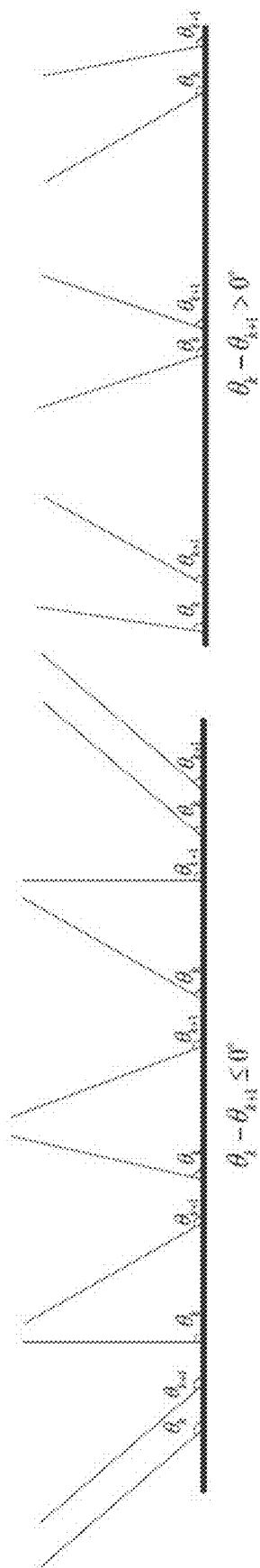
FIG. 5 is a status diagram of adjacent curves of a characteristic block and an inverted characteristic block according to Embodiment 2 of the disclosure.

To identify and position the characteristic block, it is necessary to analyze a characteristic of the characteristic block and thus digitalize the characteristic of the characteristic block. For the characteristic block divided into two curves, FIG. 5 shows a possible status of the two curves of a characteristic block and an inverted characteristic block. The two adjacent curves of the characteristic block have a certain characteristic relationship: a minimum distance, an upper-endpoint height difference and an included angle difference. The minimum distance represents a minimum pixel distance between the two adjacent curves. The included angle difference represents an included angle between an equivalent straight line for two adjacent curves and a horizontal direction. The upper-endpoint height difference represents a height difference between two highest points of the two adjacent curves, that is, a difference between longitudinal coordinates.

In order to calculate a characteristic relationship of the included angle difference, it is assumed that the equivalent straight line for the curves is:

$$Y_j = \tan(\theta)X_i + a \qquad (6)$$

Here, $\theta$ is the included angle between the equivalent straight line and the horizontal direction. $X_i$ and $Y_i$ are respectively a horizontal coordinate and a longitudinal coordinate of a pixel point i in the curve. In order to determine a $\theta$ value of the equivalent straight line, with a sum of a square of a difference of an actual value and a calculated value of the equivalent straight line being minimized as an optimization criteria, an expression for solving the $\theta$ value of the included angle is as follows, $$\theta = \arg\min_{\theta} \sum (Y_i - \tan(\theta)X_i - a)^2 \qquad (7)$$

Figure 6:
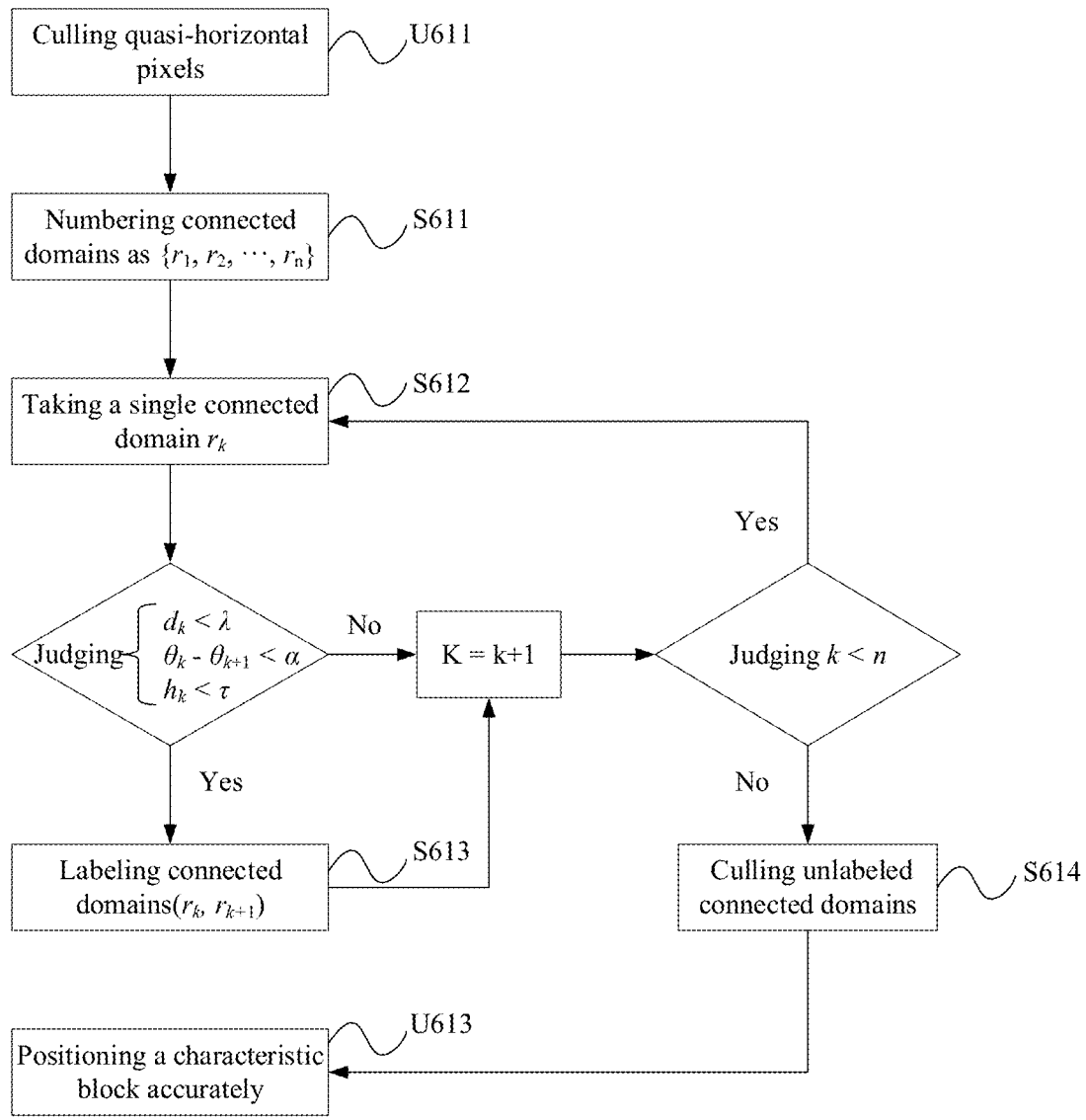
FIG. 6 is a program block diagram of a characteristic block refined positioning module according to Embodiment 2 of the disclosure.

Gray values of pixel points at highest points and lowest points of the characteristic block and the inverted characteristic block completely retained in the image are set as zero, so that the completely retained characteristic block and inverted characteristic block are divided into two curves. The image subjected to the above processing is B'(x, y). The minimum distance between the two curves of the characteristic block is always within a certain small threshold. Upper points are also nearly located at a same height, that is, the upper-endpoint height difference is also within a small threshold. Meanwhile, the included angle difference between the two curves of the inverted characteristic block and the characteristic block differs greatly. In this sense, a program block diagram for implementing identification of the characteristic block is as shown in FIG. 6, with detailed steps as follows.

At Step 1: multiple connected domains are provided in an image B'(x, y) and the connected domains are numbered from left to right as $\{r_1, r_2, \ldots, r_n\}$ (S611).

At Step 2: a single connected domain $r_k$ is taken (S612), and a minimum distance between $r_k$ and $r_{k+1}$ is calculated, with an expression:

$$d_k = \min\|r_k(i) - r_{k+1}(j)\| \qquad (8)$$

Here, $r_k(i)$ is a position of a pixel point in the connected domain $r_k$. If $d_k < \Delta$ is met, the following step is continued; or otherwise, a skip is made to $r_{k+1}$, and step 2 is performed.

At Step 3: if the upper-endpoint height difference $h_k$ meets $h_k < \tau$, the following step is continued; or otherwise, a skip is made to $r_{k+1}$, and step 2 is performed.

At Step 4: an included angle difference $\theta_k - \theta_{k+1}$ between connected domains $r_k$ and $r_{k+1}$ is calculated by using formulas (6) and (7). If $\theta_k - \theta_{k+1} < \alpha$ is met, the connected domains $r_k$ and $r_{k+1}$ are labeled as a characteristic block curve pair ($r_k$, $r_{k+1}$) (S613), lower portions of the ($r_k$, $r_{k+1}$) is kept flush, a skip is made to $r_{k+1}$, and step 2 is performed; or otherwise, a skip is made to $r_{k+1}$, and step 2 is performed. The same operation is performed on all of the connected domains.

At Step 5: a gray value of a pixel point of an unlabeled connected domain is set as zero (S614).

After the identification of the two curves of the characteristic block, a characteristic block image T(x, y), a characteristic block curve pair set and $\{(r_k, r_{k+1}), \ldots\}$ are obtained, to complete the identifying and rough positioning of the characteristic block.

At S2043: the characteristic block outline is complemented based on the molten fluid outline, and the characteristic block of the molten fluid outline is accurately positioned based on a centroid of the characteristic block with a complemented outline.

In the previous step, the rough positioning of the characteristic block is achieved in the image B(x, y), in which a great deal of pixel information is lost. In this step, the characteristic block outline is complemented in the complete outline image E(x, y) and the characteristic block is further screened. The image E(x, y) and the image T(x, y) are subtracted, the image T(x, y) is corresponded to a difference image, and a connected domain is searched in the difference image between two highest points of the characteristic block curve pair ($r_k$, $r_{k+1}$). If a connected domain capable of connecting the characteristic block curve pair exists, the connected domain is filled to the image T(x, y) to complement the characteristic block outline. If the connected domain capable of connecting the characteristic block curve pair does not exist, the characteristic block curve pair is culled.

At last, the centroid ($x_t$, $y_t$) of the characteristic block is calculated by using a centroidal formula, and the characteristic block is positioned accurately, to achieve quick and refined positioning of a small target characteristic block in a high-frame-rate video, with an expression:

$$\begin{cases} x_t = \dfrac{1}{N}\sum_{n=0}^{N-1} x_n \\ y_t = \dfrac{1}{N}\sum_{n=0}^{N-1} y_n \end{cases} \qquad (9)$$

Here, N is the number of pixel points of the connected domain, and ($x_n$, $y_n$) are coordinates of a pixel point in the connected domain.

In this Embodiment of the disclosure, the characteristic block in each frame of image may be identified, and a complete outline of the characteristic block may be retained, by extracting the characteristic block of the molten fluid outline. In this Embodiment, the characteristic block outline is separated from the line of the molten fluid outline, by taking advantage of the line of the molten fluid outline being substantially in a horizontal status and a large included angle present between the characteristic block and the line of the molten fluid outline. The separation is accurate, and the integrity of the outline is high.

At S205: a characteristic of the characteristic block is obtained, and similarity matching is performed between two adjacent frames by using the characteristic of the characteristic block, to obtain a pixel distance moved by the characteristic block within a time period of two adjacent frames. The characteristic includes a size characteristic, an angle characteristic and a position characteristic.

Specifically, in this Embodiment, in order to obtain the pixel distance moved by the characteristic block within a time period of two adjacent frames, the characteristic of the characteristic block is obtained first, and the similarity matching is performed between two adjacent frames by using the characteristic of the characteristic block. In this Embodiment, the characteristic of the characteristic block is the size characteristic, the angle characteristic and the position characteristic respectively. The size characteristic represents an orthogonal axial length of the characteristic block, that is, maximum length and width. The angle characteristic represents an included angle between the characteristic block and the horizontal direction. The position characteristic represents position coordinates of the centroid of the characteristic block.

In order to calculate the size characteristic and the angle characteristic, an $(i+j)^{th}$ moment of a boundary point of the characteristic block is calculated first, and defined as:

$$\mu_{ij} = \sum_{m=0}^{M}(x_m - x_t)^i(y_m - y_t)^j \quad (10)$$

Here, M is the number of boundary pixel points of the characteristic block, and the pixel point on a boundary of the characteristic block is represented as $(x_m, y_m)$. A semi-major axis $r_1$ and a semi-minor axis $r_2$ of an equivalent ellipse of the characteristic block, that is, the orthogonal axial length of the characteristic block, may be calculated according to the $(i+j)^{th}$ moment, with an expression:

$$\begin{cases} r_1 = \sqrt{2(\mu_{2,0} + \mu_{0,2} + \sqrt{(\mu_{2,0} - \mu_{0,2})^2 + 4\mu_{1,1}^2})} \\ r_2 = \sqrt{2(\mu_{2,0} + \mu_{0,2} - \sqrt{(\mu_{2,0} - \mu_{0,2})^2 + 4\mu_{1,1}^2})} \end{cases} \quad (11)$$

An included angle β between the equivalent ellipse of the characteristic block and the horizontal direction, that is, the angle characteristic of the characteristic block, may be further obtained by using the $(i+j)^{th}$ moment, with an expression:

$$\beta = -\frac{1}{2}\arctan\left(\frac{2\mu_{1,1}}{\mu_{0,2} - \mu_{2,0}}\right) \quad (12)$$

According to the characteristic of the characteristic block such as the semi-major axis $r_1$, the semi-minor axis $r_2$, the included angle β and the centroid $(x_t, y_t)$, a position, a shape and a direction of the characteristic block may be determined. Similar characteristic blocks in the previous frame of image T(x, y) and a later frame of image T'(x, y) are determined by using the following searching algorithm, and the algorithm includes the following steps.

At Step 1: with a horizontal coordinate $x_t$ of a centroid of a characteristic block in an image T(x, y) as a start point, $x'_t$ of a centroid of a characteristic block is searched backwards along a horizontal axis in an image T'(x, y).

At Step 2: the centroid meeting a condition of $x'_t-x_t<1$ is labeled in the image T'(x, y), 1 being a threshold set according to observation.

At Step 3: within a short time, a shape of the characteristic block does not change greatly and a height of the centroid only changes slightly. If a longitudinal coordinate of a labeled centroid exists and meets $|y'_t-y_t|\leq h'$, it is indicated that the two characteristic blocks may be similar, and a label of a characteristic block not meeting the condition is removed; and if the longitudinal coordinate of the labeled centroid does not exist, all labels are removed, a skip is made to coordinates of a next centroid in the image T(x, y), and the step 1 is continued.

At Step 4: a semi-major axis $r_1'$, a semi-minor axis $r_2'$, and an included angle β' of the labeled characteristic block of the image T'(x, y) are calculated by using formulas (11) and (12), and converted into three parameters ($r_1'$ cos β', $r_1'$ sin β', $r_2'$) having a same dimension, characteristic block parameters are represented by $(x'_1, x'_2, x'_3)$, and similarly, characteristic block parameters of the image T(x, y) are represented by $(x_1, x_2, x_3)$.

At Step 5: in order to evaluate a similarity between the two characteristic blocks in real time online, a similarity coefficient ρ is provided, that is, $$\rho = \frac{\sum_{k=1}^{3} x_k x'_k}{\sqrt{\sum_{k=1}^{3} x_k^2} \sqrt{\sum_{k=1}^{3} x_k'^2}} \quad (13)$$

ρ has a value in a range of [−1, 1]. The larger the value of ρ, the better the similarity. The characteristic block having a maximized matching similarity ρ and meeting ρ>ξ in the image T'(x, y) is considered as successful matching, to obtain a horizontal pixel distance $S_C$ moved by the characteristic block, a skip is made to the coordinate of the next centroid in the image T(x, y), and the step 1 is continued. An expression of $S_C$ may be written as:

$$S_C = x'_t - x_t \quad (14)$$

In this Embodiment, by using the size characteristic, the angle characteristic and the position characteristic of the characteristic block, the similarity matching between adjacent frames is performed for a positioning result of the characteristic block from multiple perspectives. As a result, the characteristic block can be accurately identified, tracked and positioned, further the pixel distance moved by the characteristic block within a time period of two adjacent frames is obtained accurately, such that the accuracy of subsequent flow velocity detection is improved greatly.

At S206: according to installation parameters on site, a high-speed camera that collects the video stream of the high-temperature high-velocity molten fluid is calibrated, to establish a relationship between an image coordinate system and a world coordinate system.

At S207: a moved distance of the characteristic block in the world coordinate system is solved, with a calculation formula for calculating the moved distance:

$$S_W = \frac{R}{R_c} S_C \qquad (15)$$

Here, $S_W$ is the moved distance of the characteristic block in the world coordinate system, R is a diameter of a round hole of an outlet of a reaction furnace, $R_c$ is a diameter pixel of the outlet of the reaction furnace in an image, and $S_c$ is the pixel distance moved by the characteristic block of the molten fluid within a time period of two adjacent frames.

At S208: the flow velocity of the high-temperature high-velocity molten fluid is obtained based on the moved distance and a velocity formula.

In this Embodiment, by virtue of a relationship between an image coordinate system and a world coordinate system, horizontal distances $S_{Wj}$ moved by a plurality of characteristic blocks in two adjacent frames of images in the real world coordinate system may be obtained, with j=1, 2, ... , J; and $S_{Wj}$ is averaged, that is, $$\bar{S}_W = \frac{1}{J} \sum_{j=1}^{J} S_{Wj} \qquad (16)$$

A flow velocity $V_x$ of molten iron in a horizontal direction is obtained according to a velocity formula, that is, $$V_x = \bar{S}_W f \qquad (17)$$

Here, f is a frame rate at which a video is taken by the camera. According to an actual elevation angle Φ of a tapping hole on site, the flow velocity of the molten iron at the tapping hole is expressed as:

$$V = \frac{V_x}{\cos\phi} \qquad (18)$$

Therefore, the whole working process is completed finally.

According to the method for detecting the flow velocity of the high-temperature molten fluid provided by this embodiment of the disclosure, by collecting a video stream of a high-temperature high-velocity molten fluid, decomposing the video stream into a frame image sequence sorted by time, and extracting a molten fluid ROI in the frame image sequence, extracting a molten fluid outline of the molten fluid ROI, and extracting a characteristic block of the molten fluid outline, and obtaining the flow velocity of the molten fluid based on the characteristic block which is a ripple or shadow present during outflowing of the high-temperature molten fluid at a high-velocity, a technical problem that a flow velocity detection accuracy to a molten fluid with a high temperature, a high velocity and a high glossiness presently is not high is solved. By obtaining a high-frame-rate video stream of an outflow of the high-temperature molten fluid in a non-intrusive manner, by accurately tracking and positioning a small target significant characteristic block of the molten fluid in real time, a flow velocity detection process for the molten fluid with the high temperature, the high velocity and the high glossiness is achieved. The method has the advantages of high accuracy, strong stability, long periodicity, applicability to a high-temperature or ultra-high-temperature fluid flowing at a high velocity, low investment cost, etc.

An objective of the disclosure is to provide a method for quick and refined positioning a small target significant characteristic block in a high-frame-rate video based on an outline image of an outflow of a high-velocity molten fluid. An objective of the disclosure is to provide a method for transient matching of significant characteristic blocks in two adjacent frames of images by using a characteristic of the characteristic block of a molten fluid. An objective of the disclosure lies in parallel transplanting an algorithm for detecting a flow velocity of a molten fluid mentioned in a patent to a parallel programming model and a multi-Graphic-Processing-Units (GPU) universal computing architecture, such that the execution efficiency of the algorithm is greatly improved, and the requirement of flow velocity detection in real time is met.

Figure 7:
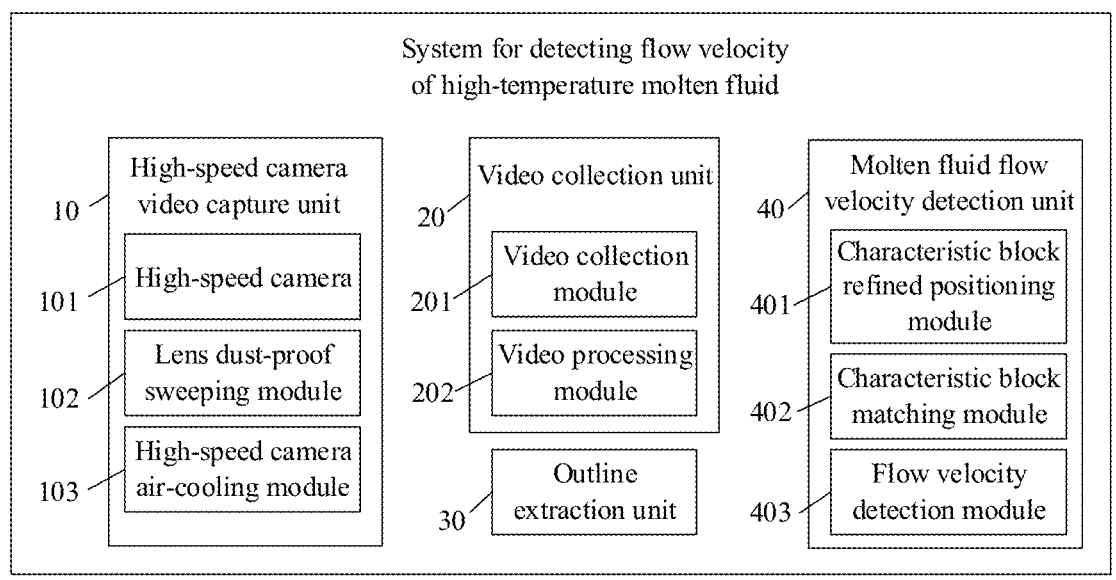
FIG. 7 is a structural block diagram of a system for detecting a flow velocity of a high-temperature molten fluid according to the disclosure.

Referring to FIG. 7, a system for detecting a flow velocity of a high-temperature molten fluid provided by an embodiment of disclosure includes: a high-speed camera video capture unit 10, as well as a video collection unit 20, an outline extraction unit 30 and a molten fluid flow velocity detection unit 40 sequentially connected to the high-speed camera video capture unit 10.

The high-speed camera video capture unit 10 is configured to collect a video stream of a high-temperature high-velocity molten fluid.

The video collection unit 20 is configured to decompose the video stream into a frame image sequence sorted by time, and extract a molten fluid ROI from the frame image sequence.

The outline extraction unit 30 is configured to extract a molten fluid outline of the molten fluid ROI.

The molten fluid flow velocity detection unit 40 is configured to extract a characteristic block of the molten fluid outline, and obtain the flow velocity of the molten fluid based on the characteristic block. The characteristic block specifically is a ripple or shadow present during outflowing of the high-temperature molten fluid at a high-velocity.

Optionally, the high-speed camera video capture unit 10 includes a high-speed camera 101 configured to collect the video stream of the high-temperature high-velocity molten fluid, a lens dust-proof sweeping module 102 disposed on the high-speed camera 101, and a high-speed camera air-cooling module 103.

The lens dust-proof sweeping module 102 is configured to sweep a lens of the high-speed camera 101 when the high-speed camera 101 is not in work.

The high-speed camera air-cooling module 103 is configured to cover a body of the high-speed camera completely, and accelerate a flow rate of air between an air-cooling apparatus and the body of the high-speed camera via an external blower to achieve heat dissipation and cooling.

In this embodiment, the lens dust-proof sweeping module 102 sweeps the high-speed camera when the high-speed camera is not in work, and automatically covers, after the completion of sweeping, the lens with a lens protective cap to prevent dust from falling onto the lens, till the high-speed camera starts to work. The high-speed camera air-cooling module 103 covers the body of the high-speed camera completely, and accelerates the flow rate of the air between the air-cooling apparatus and the body of the high-speed camera via an external blower to achieve the heat dissipation and cooling purpose. In order to meet a velocity measurement requirement, it is most important to select parameters of a frame rate and a resolution ratio of the high-speed camera. An appropriate frame rate guarantees that the characteristic block of the high-velocity flowing molten fluid can be tracked without losing. A sufficient resolution ratio can provide more detailed information for the characteristic block in the image. Next, the high-speed camera needs to be installed at a position with a certain distance from the molten fluid, and a metal baffle plate is provided therebetween for separation to reduce heat radiation; and the camera lens collects a video image via a window of the baffle plate.

On a smelting site, during outflowing of the molten fluid from an outlet of a reaction furnace, the molten fluid emits strong heat radiation to the outside and a great deal of dust exists on site. A black shadow during imaging may be formed due to the dust covering the lens of the high-speed camera 101. Hence, it is necessary to install the lens cooling apparatus 102 and the dust-proof sweeping apparatus 103 for the lens of the high-speed camera, to guarantee the high-speed camera operates stably for a long time on a complex and severe site.

Optionally, the video collection unit 20 includes a video collection module 201 and a video processing module 202.

The video collection module 201 includes: an A/D module configured to convert a video source analog signal from the high-speed camera video capture unit 10 into a digital signal, a memory module configured to store the video signal, and a video compression module configured to compress the video signal, and transmit a compressed video signal to the video processing module 202.

The video processing module 202 includes: a video stream decomposition module configured to decompose a compressed video stream transmitted from the video collection module 201 into a frame image sorted by time, and a frame image ROI extraction module configured to extract a molten fluid ROI from the frame image, and transmit an extracted frame image group to the outline extraction unit 30.

In this embodiment, the video collection module 201 converts the video source analog signal from the video capture unit of the high-speed camera 101 into the digital signal by a video collection card via the A/D conversion module in the high-speed collection card, and then sends the digital signal to the memory module built in the card. After the digital signal is stored for a period of time, the video compression module built in the video collection card compresses a great number of video signals, and sends compressed video signals to the video processing module 202 for processing. Meanwhile, for a video stream collected currently, the video collection card creates a new storage space in the memory to store the current video stream, and releases the storage space of the previous video steam.

In this embodiment, via an FPGA programmable hardware platform of a hardware logic circuit preloaded with a video stream decomposition program and a frame image ROI extraction program, the video processing module segments the compressed video stream transmitted from the video collection module 201 into the frame image sorted by time, and at the same time extracts the molten fluid ROI from the frame image, to reduce subsequent processing time, and then sends an ROI extracted frame image group to the outline extraction unit 30, to obtain a to-be-processed frame image group, thus completing a work process of the unit.

In order to improve the integration level of the apparatus, the outline extraction unit and the video collection unit are implemented on a same FPGA programmable hardware platform in this embodiment. The outline extraction unit is composed of an image preprocessing module and a single-pixel outline extraction module.

Optionally, the molten fluid flow velocity detection unit 40 includes a characteristic block refined positioning module 401, as well as a characteristic block matching module 402 and a flow velocity detection module 403 sequentially connected to the characteristic block refined positioning module 401.

The characteristic block refined positioning module 401 includes a quasi-horizontal pixel culling submodule, a characteristic block identifying and rough positioning submodule, and a characteristic clock accurate positioning submodule.

The quasi-horizontal pixel culling submodule is configured to cull a pixel point in quasi-horizontal distribution from the molten fluid outline, retain a characteristic block pixel point forming a large inclination angle with a horizontal direction, and separate a characteristic block outline from the molten fluid outline.

The characteristic block identifying and rough positioning submodule is configured to calculate a minimum distance, an upper-endpoint height difference and an included angle difference between two adjacent curves in the characteristic block outline, and roughly position the characteristic block of the molten fluid outline based on the minimum distance, the upper-endpoint height difference and the included angle difference.

The characteristic clock accurate positioning submodule is configured to complement the characteristic block outline based on the molten fluid outline, and accurately position the characteristic block of the molten fluid outline based on a centroid of the characteristic block with a complemented outline.

The characteristic block matching module 402 is configured to perform similarity matching between two adjacent frames by using the characteristic of the characteristic block, to obtain a pixel distance moved by the characteristic block within a time period of two adjacent frames.

The flow velocity detection module 403 includes a camera calibration submodule and a flow velocity output submodule. The camera calibration submodule is configured to calibrate a high-speed camera and solve a moved distance of the characteristic block in a world coordinate system. The flow velocity output submodule is configured to calculate and output the flow velocity of the molten fluid.

The molten fluid flow velocity detection unit is a key unit in the disclosure. It is mainly intended to, after identifying and positioning the characteristic block in the outline, analyze the characteristic block of each frame, and perform the similarity matching on the characteristic blocks in two adjacent frames of images, thus completing a detection process. This unit is an architectural image processing software system with multiple GPUs as a hardware platform. The hardware platform has a parallel computational processing architecture, to implement real-time detection on the flow velocity of the molten fluid. This unit is composed of the characteristic block refined positioning module 401, the characteristic block matching module 402 and the flow velocity detection module 403.

The flow velocity detection module 403 is a final result output portion in this embodiment of the disclosure. Its function is to perform integrated processing after the previous two modules of the molten fluid flow velocity detection unit process one frame image group, and calculate the flow velocity of the molten fluid according to an actual site condition. This module is composed of two functional submodules, namely, the camera calibration submodule and the flow velocity output submodule.

Figure 8:
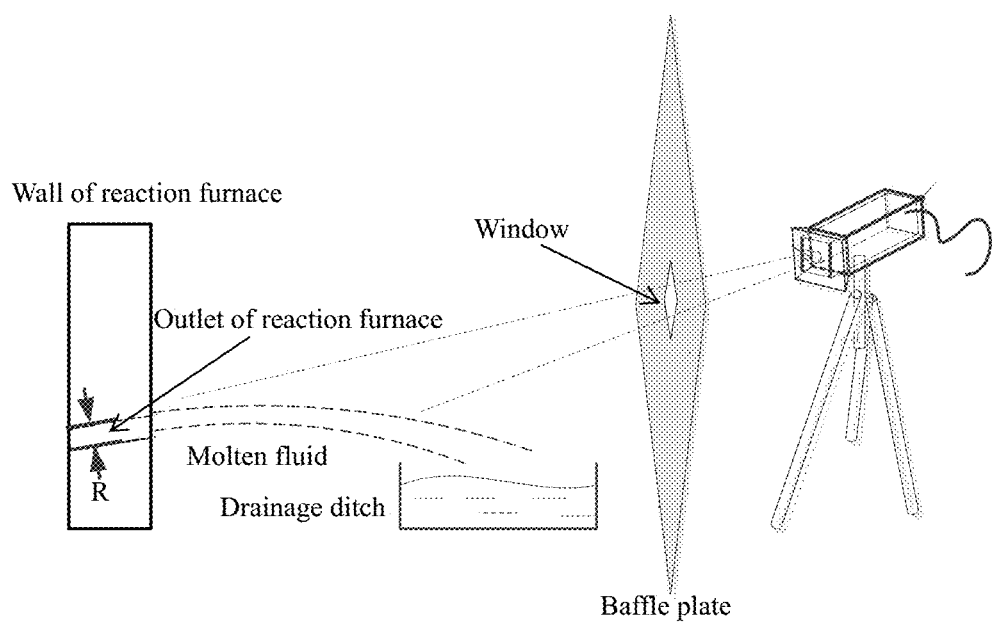
FIG. 8 is an apparatus for detecting a flow velocity of a high-temperature molten fluid and a site schematic diagram according to the disclosure.

A specific implementation solution of the disclosure is further described in combination with the accompanying drawings. The disclosure was applied to a 2650 m³ blast furnace in China. The high-speed camera and other apparatuses were installed at one of three tapping holes of the blast furnace according to FIG. 8. On camera selection, it is most important to select parameters of a frame rate and a resolution ratio. An appropriate frame rate can capture movement information of a molten iron fluid, and a sufficient resolution ratio can provide more detailed information in the image. According to estimation of a worker on site, the flow velocity of the molten iron from the tapping hole of the blast furnace was 5-6 m/s. In order to meet the requirement of flow velocity detection, the high-speed camera had a resolution ratio of 1280*720 and a frame rate of 240. The specific implementation solution for completing a whole detection process of the flow velocity of the molten fluid included the following steps.

At Step 1: according to installation parameters of the high-speed camera and site data, the camera was calibrated, and a relationship between an image coordinate system and a world coordinate system was determined.

At Step 2: within one cycle for blast furnace tapping, a high-speed camera video capture unit captured an outflow video of a molten iron fluid in real time. A video collection unit 20 collected the outflow video of the molten iron fluid for one minute in real time, compressed and stored the outflow video and then sent the outflow video to a video processing unit. Then, the video collection unit 20 collected a current video again. The video collection unit 20 repeated this process.

At Step 3: the video processing unit decomposed a compressed video of the molten iron fluid into a frame image, and extracted a molten iron fluid ROI from the frame image to obtain a to-be-processed frame image group.

At Step 4: the frame image group obtained in the step 3 was subjected to grayscale transformation and image enhancement processing to complete an image preprocessing process (U51), and then subjected to a Canny outline detection algorithm and skeleton extraction processing to complete a molten iron fluid outline extraction process, obtaining a single-pixel molten iron fluid outline image for subsequent processing.

At Step 5: quasi-horizontal pixel culling processing was performed on the obtained binary molten iron fluid outline image, and at last, a target characteristic block was divided into two adjacent curves. The two adjacent curves had three characteristics, namely, a minimum distance, an included angle difference and an upper-point height difference. After analyzing a unique shape characteristic of a significant characteristic block, a characteristic block identifying and rough positioning process was completed. Then, optionally, characteristic block rough positioning results of the molten iron fluid were screened by a characteristic block accurate positioning module to remove falsely identified characteristic blocks, thus achieving refined positioning of the characteristic block.

At Step 6: by the three characteristics of the characteristic block, namely, a size, an angle and a position, a transient matching process was performed on the characteristic blocks in two adjacent frames of images, to match the characteristic blocks having a matching similarity $\rho > 0.6$. A horizontal pixel distance moved by the characteristic block within a time period of two frames was obtained from the formula (14). Then, according to the relationship between the image coordinate system and the world coordinate system obtained by calibrating the camera in the step 1, the pixel distance was converted into a real world distance.

At Step 7: after one frame image group was processed completely by the above steps, all abnormal values of distance data were culled, an average value was taken. An average flow velocity value of the outflow of the molten iron fluid within the time period when the current frame image group was collected was obtained, according to an elevation angle at the outlet of the reaction furnace.

Specific working process and working principle of the system for detecting the flow velocity of the high-temperature molten fluid in this embodiment may be referred to the working process and the working principle of the method for detecting the flow velocity of the high-temperature molten fluid in this embodiment.

The above descriptions are only preferred embodiments of the disclosure and are not intended to limit the disclosure. For a person skilled in the art, the disclosure may have various modifications and changes. Any modification, equivalent replacement, improvement and the like made within a spirit and a principle of the disclosure should be included in a protection scope of the disclosure.

The invention claimed is:

1. A method for detecting a flow velocity of a high-temperature molten fluid, comprising:
   collecting a video stream of a high-temperature high-velocity molten fluid;
   decomposing the video stream into a frame image sequence sorted by time, and extracting a molten fluid Region Of Interest (ROI) from the frame image sequence;
   extracting a molten fluid outline of the molten fluid ROI; and
   extracting a characteristic block of the molten fluid outline, and obtaining the flow velocity of the molten fluid based on the characteristic block, the characteristic block being a ripple or shadow present during outflowing of the high-temperature molten fluid at a high-velocity.

2. The method for detecting the flow velocity of the high-temperature molten fluid of claim 1, wherein the extracting the molten fluid outline of the molten fluid ROI comprises:
   preprocessing the molten fluid ROI to obtain a preprocessed image;
   calculating a gradient magnitude and a direction of the preprocessed image by using a first-order partial-derivative finite difference, and performing non-maximum suppression on the gradient magnitude; and
   detecting and connecting the molten fluid outline of the molten fluid ROI by using a dual-threshold algorithm, and thinning the molten fluid outline by using a skeleton extraction algorithm.

3. The method for detecting the flow velocity of the high-temperature molten fluid of claim 1, wherein the extracting the characteristic block of the molten fluid outline comprises:
   culling a pixel point in quasi-horizontal distribution from the molten fluid outline, retaining a characteristic block pixel point forming a preset inclination angle with a horizontal direction, and separating a characteristic block outline from the molten fluid outline;
   calculating a minimum distance, an upper-endpoint height difference and an included angle difference between two adjacent curves in the characteristic block outline, and roughly positioning the characteristic block of the molten fluid outline based on the minimum distance, the upper-endpoint height difference and the included angle difference; and complementing the characteristic block outline based on the molten fluid outline, and accurately positioning the characteristic block of the molten fluid outline based on a centroid of the characteristic block with a complemented outline.

4. The method for detecting the flow velocity of the high-temperature molten fluid of claim 3, wherein the obtaining the flow velocity of the molten fluid based on the characteristic block comprises:

obtaining a characteristic of the characteristic block, the characteristic comprises a size characteristic, an angle characteristic and a position characteristic;

performing similarity matching between two adjacent frames by using the characteristic of the characteristic block, to obtain a pixel distance moved by the characteristic block within a time period of two adjacent frames;

calibrating, according to installation parameters on site, a high-speed camera that collects the video stream of the high-temperature high-velocity molten fluid, to establish a relationship between an image coordinate system and a world coordinate system;

solving a moved distance of the characteristic block in the world coordinate system, with a calculation formula for calculating the moved distance:

$$S_W = \frac{R}{R_c} S_C,$$

where $S_W$ is the moved distance of the characteristic block in the world coordinate system, R is a diameter of a round hole of an outlet of a reaction furnace, $R_c$ is a diameter pixel of the outlet of the reaction furnace in an image, and $S_c$ is the pixel distance moved by the characteristic block of the molten fluid within a time period of two adjacent frames; and obtaining the flow velocity of the high-temperature high-velocity molten fluid based on the moved distance and a velocity formula.

5. The method for detecting the flow velocity of the high-temperature molten fluid of claim 4, wherein the obtaining the characteristic of the characteristic block comprises:

calculating an $(i+j)^{th}$ moment of a boundary point of the characteristic block, with a calculation formula:

$$\mu_{ij} = \sum_{m=0}^{M} (x_m - x_t)^i (y_m - y_t)^j,$$

where $\mu_{ij}$ is the $(i+j)^{th}$ moment of the boundary point of the characteristic block, M is a number of boundary pixel points of the characteristic block, m=0, 2, ..., M, $(x_m, y_m)$ is an $m^{th}$ pixel point in a boundary of the characteristic block, and $(x_t, y_t)$ are coordinates of the centroid;

calculating a semi-major axis $r_1$ and a semi-minor axis $r_2$ of an equivalent ellipse of the characteristic block according to the $(i+j)^{th}$ moment, with a calculation formula:

$$\begin{cases} r_1 = \sqrt{2\left(\mu_{2,0} + \mu_{0,2} + \sqrt{(\mu_{2,0} - \mu_{0,2})^2 + 4\mu_{1,1}^2}\right)} \\ r_2 = \sqrt{2\left(\mu_{2,0} + \mu_{0,2} - \sqrt{(\mu_{2,0} - \mu_{0,2})^2 + 4\mu_{1,1}^2}\right)} \end{cases},$$

where $r_1$ and $r_2$ are respectively the semi-major axis and the semi-minor axis of the equivalent ellipse of the characteristic block, $\mu_{2,0}$ is a value of $\mu_{ij}$ when i=2, j=0, $\mu_{0,2}$ is a value of $\mu_{ij}$ when i=0, j=2, and $\mu_{1,1}$ is a value of $\mu_{ij}$ when i=1, j=1;

calculating an included angle between the equivalent ellipse of the characteristic block and a horizontal direction based on the $(i+j)^{th}$ moment, with a calculation formula:

$$\beta = -\frac{1}{2} \arctan\left(\frac{2\mu_{1,1}}{\mu_{0,2} - \mu_{2,0}}\right),$$

where $\beta$ is the included angle between the equivalent ellipse of the characteristic block and the horizontal direction;

calculating the centroid of the characteristic block by using a centroidal formula shown as follows:

$$\begin{cases} x_t = \frac{1}{N} \sum_{n=0}^{N-1} x_n \\ y_t = \frac{1}{N} \sum_{n=0}^{N-1} y_n \end{cases},$$

where $(x_t, y_t)$ is the centroid of the characteristic block, N is a number of pixel points of a connected domain, and $(x_n, y_n)$ are coordinates of an $n^{th}$ pixel point in the connected domain; and obtaining the characteristic of the characteristic block according to the semi-major axis $r_1$, the semi-minor axis $r_2$, the included angle $\beta$ and the centroid $(x_t, y_t)$.

6. The method for detecting the flow velocity of the high-temperature molten fluid of claim 5, wherein the performing similarity matching between two adjacent frames by using the characteristic of the characteristic block, to obtain the pixel distance moved by the characteristic block within a time period of two adjacent frames comprises:

step 1: with a horizontal coordinate $x_t$ of a centroid of the characteristic block in a previous frame of image T(x, y) as a start point, searching a centroid $x'_t$ of the characteristic block backwards along a horizontal axis in a later frame of image T'(x, y);

step 2: labeling a centroid meeting a condition of $x'_t-x_t<l$ in the image T'(x, y), with l being a threshold set according to observation;

step 3: determining whether a longitudinal coordinate of the labeled centroid meets $|y'_t-y_t|\leq h'$, where h' is a set threshold, and $y'_t$ and $y_t$ are respectively a longitudinal coordinate of the centroid of the characteristic block in the later frame of image and a longitudinal coordinate of the centroid of the characteristic block in the previous frame of image; and if no, removing a label of the characteristic block, skipping to coordinates of a next centroid of the image T(x, y), and continuing the step 1;

step 4: calculating a semi-major axis $r_1'$, a semi-minor axis $r_2'$, and an included angle $\beta'$ of the labeled characteristic block of the image T'(x, y), converting into three parameters ($r_1'$ cos β', $r_1'$ sin β', $r_2'$) having a same dimension, characteristic block parameters being represented by ($x'_1$, $x'_2$, $x'_3$), and similarly, characteristic block parameters of the image T(x, y) being represented by ($x_1$, $x_2$, $x_3$); and step 5: in order to evaluate a similarity between the two characteristic blocks in real time online, calculating a similarity coefficient with a following formula:

$$\rho = \frac{\sum_{k=1}^{3} x_k x'_k}{\sqrt{\sum_{k=1}^{3} x_k^2} \sqrt{\sum_{k=1}^{3} x_k'^2}},$$

where ρ is the similarity coefficient, ρ has a value in a range of [−1, 1], $x_k$ is a $k^{th}$ characteristic block parameter of the image T(x, y), and $x'_k$ is a $k^{th}$ characteristic block parameter of the image T'(x, y); if a characteristic block in the image T'(x, y) having a maximized matching similarity ρ and meeting ρ>ξ, it is considered as successful matching, to obtain the horizontal pixel distance $S_C$ moved by the characteristic block, skipping to coordinates of a next centroid of the image T(x, y), and continuing the step 1, wherein a calculation formula of $S_C$ is:

$$S_C = x'_t - x_t.$$

7. A system for detecting a flow velocity of a high-temperature molten fluid, comprising a high-speed camera video capture unit, as well as a video collection unit, an outline extraction unit and a molten fluid flow velocity detection unit sequentially connected to the high-speed camera video capture unit, wherein the high-speed camera video capture unit is configured to collect a video stream of a high-temperature high-velocity molten fluid;

the video collection unit is configured to decompose the video stream into a frame image sequence sorted by time, and extract a molten fluid Region Of Interest (ROI) from the frame image sequence;

the outline extraction unit is configured to extract a molten fluid outline of the molten fluid ROI; and the molten fluid flow velocity detection unit is configured to extract a characteristic block of the molten fluid outline, and obtain the flow velocity of the molten fluid based on the characteristic block, the characteristic block being a ripple or shadow present during outflowing of the high-temperature molten fluid at a high-velocity.

8. The system for detecting the flow velocity of the high-temperature molten fluid of claim 7, wherein the high-speed camera video capture unit comprises a high-speed camera configured to collect the video stream of the high-temperature high-velocity molten fluid, a lens dust-proof sweeping module disposed on the high-speed camera, and a high-speed camera air-cooling module;

the lens dust-proof sweeping module is configured to sweep a lens of the high-speed camera when the high-speed camera is not in work; and the high-speed camera air-cooling module is configured to cover a body of the high-speed camera completely, and accelerate a flow rate of air between an air-cooling apparatus and the body of the high-speed camera via an external blower to achieve heat dissipation and cooling.

9. The system for detecting the flow velocity of the high-temperature molten fluid of claim 8, wherein the video collection unit comprises a video collection module and a video processing module, and the video collection module comprises:
an Analog/Digital (A/D) module, configured to convert a video source analog signal from the high-speed camera video capture unit into a digital signal;
a memory module, configured to store a video signal; and
a video compression module, configured to compress the video signal, and transmit the compressed video signal to the video processing module; and the video processing module comprises:
a video stream decomposition module, configured to decompose a compressed video stream transmitted from the video collection module into a frame image sorted by time; and
a frame image Region Of Interest (ROI) extraction module, configured to extract a molten fluid ROI from the frame image, and transmit an extracted frame image group to the outline extraction unit.

10. The system for detecting the flow velocity of the high-temperature molten fluid of claim 9, wherein the molten fluid flow velocity detection unit comprises a characteristic block refined positioning module, as well as a characteristic block matching module and a flow velocity detection module sequentially connected to the characteristic block refined positioning module;

the characteristic block refined positioning module comprises a quasi-horizontal pixel culling submodule, a characteristic block identifying and rough positioning submodule, and a characteristic clock accurate positioning submodule;

the quasi-horizontal pixel culling submodule is configured to cull a pixel point in quasi-horizontal distribution from the molten fluid outline, retain a characteristic block pixel point forming a large inclination angle with a horizontal direction, and separate a characteristic block outline from the molten fluid outline;

the characteristic block identifying and rough positioning submodule is configured to calculate a minimum distance, an upper-endpoint height difference and an included angle difference between two adjacent curves in the characteristic block outline, and roughly position the characteristic block of the molten fluid outline based on the minimum distance, the upper-endpoint height difference and the included angle difference;

the characteristic clock accurate positioning submodule is configured to complement the characteristic block outline based on the molten fluid outline, and accurately position the characteristic block of the molten fluid outline based on a centroid of the characteristic block with a complemented outline;

the characteristic block matching module is configured to perform similarity matching between two adjacent frames by using the characteristic of the characteristic block, to obtain a pixel distance moved by the characteristic block within a time period of two adjacent frames; and the flow velocity detection module comprises a camera calibration submodule and a flow velocity output submodule, the camera calibration submodule is configured to calibrate a high-speed camera and solve a moved distance of the characteristic block in a world coordinate system, and the flow velocity output submodule is configured to calculate and output the flow velocity of the molten fluid.

11. The method for detecting the flow velocity of the high-temperature molten fluid of claim 2, wherein the extracting the characteristic block of the molten fluid outline comprises:
culling a pixel point in quasi-horizontal distribution from the molten fluid outline, retaining a characteristic block pixel point forming a preset inclination angle with a horizontal direction, and separating a characteristic block outline from the molten fluid outline;
calculating a minimum distance, an upper-endpoint height difference and an included angle difference between two adjacent curves in the characteristic block outline, and roughly positioning the characteristic block of the molten fluid outline based on the minimum distance, the upper-endpoint height difference and the included angle difference; and
complementing the characteristic block outline based on the molten fluid outline, and accurately positioning the characteristic block of the molten fluid outline based on a centroid of the characteristic block with a complemented outline.

12. The method for detecting the flow velocity of the high-temperature molten fluid of claim 11, wherein the obtaining the flow velocity of the molten fluid based on the characteristic block comprises:
obtaining a characteristic of the characteristic block, the characteristic comprises a size characteristic, an angle characteristic and a position characteristic;
performing similarity matching between two adjacent frames by using the characteristic of the characteristic block, to obtain a pixel distance moved by the characteristic block within a time period of two adjacent frames;
calibrating, according to installation parameters on site, a high-speed camera that collects the video stream of the high-temperature high-velocity molten fluid, to establish a relationship between an image coordinate system and a world coordinate system;
solving a moved distance of the characteristic block in the world coordinate system, with a calculation formula for calculating the moved distance:

$$S_W = \frac{R}{R_c} S_C,$$

where $S_W$ is the moved distance of the characteristic block in the world coordinate system, R is a diameter of a round hole of an outlet of a reaction furnace, $R_c$ is a diameter pixel of the outlet of the reaction furnace in an image, and $S_c$ is the pixel distance moved by the characteristic block of the molten fluid within a time period of two adjacent frames; and
obtaining the flow velocity of the high-temperature high-velocity molten fluid based on the moved distance and a velocity formula.

* * * * *